April 21, 1953  J. W. HOBBS ET AL  2,635,642
EXHAUST PIPE EXTENSION
Filed Dec. 10, 1948  2 SHEETS—SHEET 1

Inventors
John W. Hobbs
Charles A. Woodcock
Sherman E. Womack
By The Firm of Charles W. Hills Attys

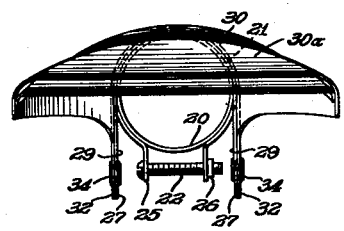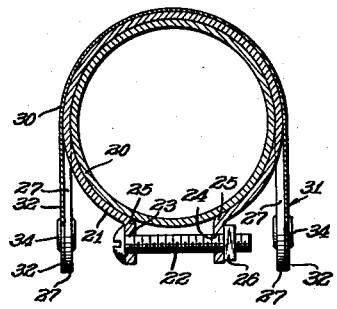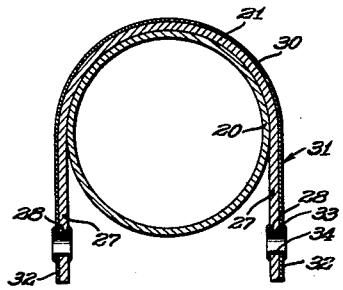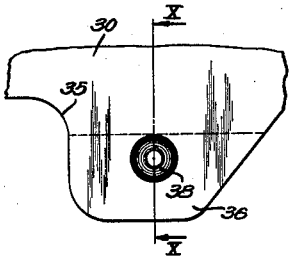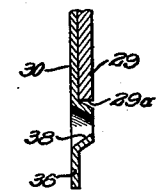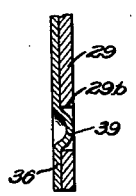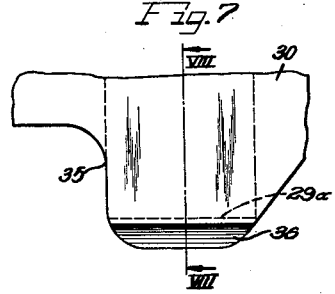

Patented Apr. 21, 1953

2,635,642

UNITED STATES PATENT OFFICE 2,635,642

EXHAUST PIPE EXTENSION

John W. Hobbs, Charles A. Woodcock, and Sherman E. Womack, Springfield, Ill., assignors to John W. Hobbs Corporation, Springfield, Ill., a corporation of Illinois Application December 10, 1948, Serial No. 64,562

7 Claims. (Cl. 138—46.5)

The present invention relates to an exhaust pipe extension and more particularly to a hinged exhaust pipe extension for automotive vehicles such as automobiles, buses, trucks and the like.

Automotive vehicles having internal combustion engines are typically equipped with an exhaust pipe for carrying exhaust gases from the engine for dissipation into the surrounding atmosphere. In order to improve the appearance of that portion of the exhaust pipe which protrudes beyond the bodily confines of the car and further to prevent corrosion of adjacent polished or electroplated surfaces by the exhaust gases of the engine, such vehicles, and particularly automobiles, are generally equipped with an exhaust pipe extension. Such exhaust pipe extensions are generally rigidly mounted on the exhaust pipe itself, as by nuts and bolts, rivets or the like. Public health laws in several states now require that garages, repair stations and the like, be equipped with exhaust fan facilities for catching and removing exhaust gases from vehicles undergoing operative testing within a closed building. Such exhaust fans are provided with flexible metal hose or similar conduits which are slipped over the terminal end of the exhaust pipe to trap exhaust gases issuing therefrom.

Heretofore, in order to attach exhaust gas conduits to the automotive exhaust pipe, it has been necessary to entirely remove the exhaust pipe extension of the automobile being tested. Inasmuch as this extension is entirely removed, the mechanic or the other person conducting the test frequently forgets to re-assemble the tail pipe extension on the exhaust pipe of the automobile. Also difficulty is frequently encountered in removing the exhaust pipe extension due to rust, collection of dirt and the like thereon. The present invention now provides a hinged type of exhaust pipe extension for positioning on the exhaust pipe of automobiles so that the exhaust removal conduit may be attached to the pipe without the necessity of removing the exhaust pipe extension.

More particularly, the exhaust pipe extension of the present invention comprises a collar or adapter sleeve adapted to be secured to the exhaust pipe by suitable means, such as by bolts and nuts passing through depending ears formed integrally with the collar portion. The collar is formed with additional dependant ears extending generally tangentially of the exhaust pipe. The exhaust extension itself is formed with dependant mounting flanges mating with the flanges of the collar, the mating flanges being secured together by suitable means, as by a rivet or the like, so that an exhaust pipe extension is pivotally secured to the collar.

Clip means are provided for maintaining the exhaust pipe extension in position upon the collar to directly overlie the terminal end of the exhaust pipe while permitting relative pivoting movement of the extension and the collar so that the terminal end of the exhaust pipe is readily accessible for the attachment of a conduit of an exhaust fan system. Preferably, the rear terminal end of the extension is elevated upon pivoting movement of the extension relative to the collar and the conduit may be easily slipped over the exposed end of the exhaust pipe proper.

The present invention contemplates the employment of various types of snap or clip arrangements to retain the extension in position upon the collar while permitting the relative pivoting movement hereinbefore described. For example, the exhaust pipe extension may be formed with depending terminal flanges which are deflected inwardly to underlie a portion of the collar. Alternatively, a protuberance or dished portion may be formed in the extension to underlie an adjacent portion of the adapter sleeve.

It is, therefore, an important object of the present invention to provide an exhaust pipe extension for automotive vehicles which is secured to the exhaust pipe of the vehicle for relative pivoting movement to permit the attachment of exhaust conduit to the exhaust pipe end.

Another important object of the present invention is to provide an improved exhaust pipe extension comprising a collar rigidly mounted on the exhaust pipe of the vehicle and a tail pipe extension pivotally attached to the collar for movement relative thereto to expose the terminal end of the exhaust pipe.

A further important object of the present invention is to provide an exhaust pipe extension comprising a collar adapted to be secured to the exhaust pipe of an automotive engine, an exhaust pipe extension pivotally mounted on said collar for movement relative thereto to expose the terminal end of the exhaust pipe and means for retaining the extension in position directly overlying the exhaust pipe to detect exhaust gases issuing therefrom.

Other and further important objects of this invention will be apparent from the disclosures in the specification and the accompanying drawings.

On the drawings:

Figure 4 is a rear elevation view of the extension of Figure 1;

Figure 5 is a cross-section view with parts shown in elevation, taken along the plane IV—IV of Figure 1;

Figure 6 is a cross-section view taken along the plane VI—VI of Figure 1;

Figure 7 is a fragmentary side elevational view showing means for retaining a tail pipe extension in position to overlie the exhaust pipe;

Figure 8 is a cross-sectional view taken along the plane VIII—VIII of Figure 7;

Figure 9 is a fragmentary view similar to Figure 7 illustrating other means for retaining the exhaust pipe extension in position;

Figure 10 is a cross-sectional view taken along the plane X—X of Figure 9;

Figure 11 is a fragmentary view similar to Figure 7 showing still further means for retaining an exhaust pipe extension in position;

Figure 12 is a cross-sectional view taken along the plane XII—XII of Figure 11; and Figure 13 is a cross-sectional view of still another form of retaining the pipe extension in position to overlie the exhaust pipe.

Figure 1:
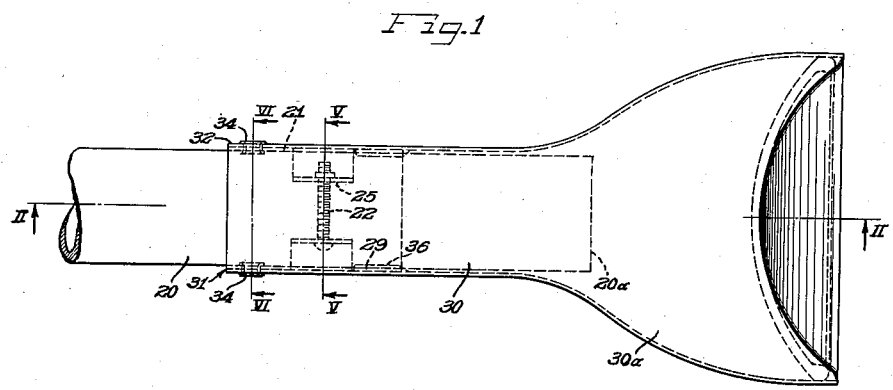
Figure 1 is a plan elevational view of an exhaust pipe extension of the present invention.

As shown on the drawings in Figures 1–6, reference numeral 20 refers generally to an exhaust pipe of an internal combustion engine, such as an automotive engine. The pipe 10 serves to convey exhaust gases from the exhaust manifold of the engine (not shown) to the rear of the vehicle and terminates in an open terminal end 20a.

An adapter sleeve or collar 21 surrounds a portion of pipe 20 adjacent terminal end 20a, the collar 21 secured to the exhaust pipe by means of a bolt 22 extending through registering apertures 23 and 24 formed in depending ears 25 formed integrally with collar 21. A nut 26 threaded on bolt 22, bearing against one of the ears 25, serves to urge the ears together maintaining the collar in rigidly mounted position upon pipe 20. The collar 21 is also provided with a pair of downwardly extending, integrally formed mounting flanges 27 extending tangentially to pipes 10 in diametrically opposed relation. Depending flanges 27 are apertured as at 28 for a purpose to be hereinafter more fully described. Collar 21 is further provided with a pair of depending legs 29 extending tangentially to pipe 20 on diametrically opposed sides in a plane common with flanges 27 hereinbefore described. Legs 29 terminate above the lowermost portion of flanges 27 in closely spaced relation to the lower extremity of pipe 20.

An exhaust pipe extension 30, preferably formed of sheet metal contoured to conform to a portion of the periphery of collar 21, is adapted to closely overlie the upper portion of the collar 21 and is further provided with a rearward flared portion 30a overlying terminal end 20a of pipe 20 and extending rearwardly therebeyond. Portion 30a of pipe extension 20 serves to deflect downwardly those gases issuing from the terminal end 20a of pipe 20 to prevent tarnishing or corrosion of adjacent parts of the automobile.

Extension 30 is provided with depending skirt portions 31 extending on each side of adapter sleeve 11, the depending skirts 31 having a forward portion 32 conforming in outline to depending flanges 27 and adapted to closely overlie these flanges. Skirt portion 32 is apertured as at 33, the aperture 33 and aperture 28 formed in flange 17 being in registry as indicated in Figure 6. Suitable fastening means, such as hollow rivets 34, extend through the registering apertures 28 and 33 to form a pivotable connection between the adapter sleeve 21 and the pipe extension 30.

The skirt portion 31 is recessed as at 35 to provide access to bolt 22 and nut 26 so that adapter sleeve 21 may be removed from exhaust pipe 20. A depending flange portion 36 is provided in skirt 31 rearwardly of recess 35, flange 36 being deflected inwardly as shown in Figures 7 and 8 to underlie the lower edge 29a of leg 29. The flange 36 thus underlying leg 29 provides snap fastening means for retaining pipe extension 30 in position to closely overlie exhaust pipe 20 and adapter sleeve 21 as shown in Figure 2.

Figure 2:
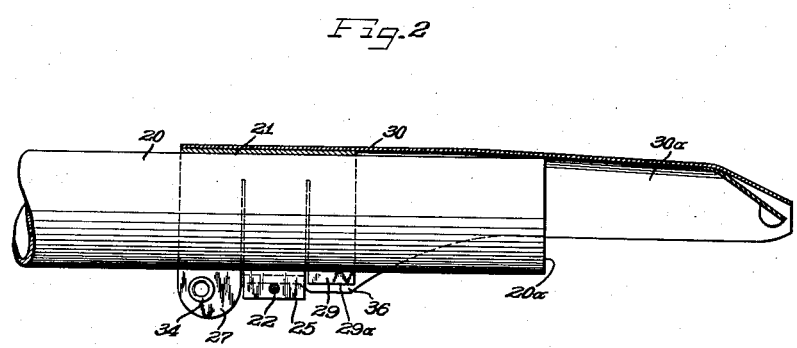
Figure 2 is a cross-sectional view, with parts shown in elevation, taken along the plane II—II of Figure 1.
Figure 3:
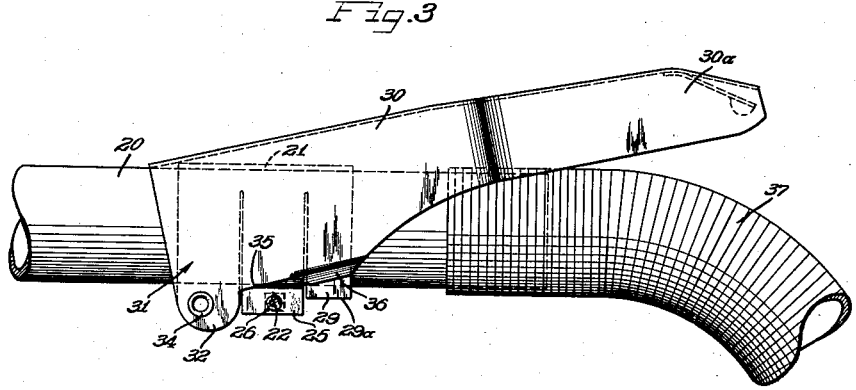
Figure 3 is a side elevational view showing an exhaust conduit of an exhaust fan system connected to the exhaust pipe with the exhaust pipe extension pivoted into elevated position.

The operation of the improved exhaust pipe extension of the present invention will be readily appreciated by those skilled in the art from Figures 2 and 3 of the drawings. As shown in Figure 3 the extension 30 may be elevated by pivoting the extension about rivet 34 to urge flange 36 out of engagement with leg 29. In the position shown in Figure 3, terminal end 20a of exhaust pipe 20 is exposed and a flexible exhaust conduit 37, connected to a suitable fan (not shown), may be readily secured to the exhaust pipe without the necessity of completely removing the exhaust pipe extension 30.

Other suitable contacting means for retaining extension 30 in the position shown in Figure 2 while permitting pivoting movement of the extension to the position of Figure 3 are shown in Figures 9 through 12 of the drawing. In Figure 9, flanges 36 are extended downwardly beyond leg 29, but instead of deflecting the flange 36 inwardly as in Figure 8, the flange is provided with a dished, inwardly extending apertured portion 38 closely underlying lower edge 29a of leg 29. The portion 38 may suitably be formed by a punching operation as is well known in the art. Alternatively, an elongated inwardly dished portion 39 may be provided with the flange 36 as shown in Figures 11 and 12. Elongated dished portion 39 directly underlies the lower edge 29a of leg 29 and engages edge 29a to prevent unwanted pivoted movement of the extension 30. If desired, leg 29 might be extended downwardly as shown in Figure 13 with the leg 29 being apertured as at 29b to receive dished portion 39 formed in flange 36.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. An exhaust pipe extension for the exhaust pipe of an automotive vehicle comprising an adapter sleeve adapted to be rigidly mounted on said exhaust pipe adjacent the terminal end thereof, an exhaust pipe extension for overlying said adapter sleeve to extend beyond the terminal end of said exhaust pipe, and means for pivotally securing said exhaust extension to said sleeve to permit pivotal movement of said extension to expose a terminal end of said pipe, said extension having an integrally formed projection spaced longitudinally from said pivotally securing means and engaging an adjacent portion of said sleeve spaced from said pivotally securing means to retain said extension against pivoting movement relative to said sleeve.

2. An exhaust pipe extension for the exhaust pipe of an automotive vehicle comprising an adapter sleeve, means for securing said adapter sleeve to said exhaust pipe adjacent a terminal end thereof, an exhaust pipe extension adapted to overlie said adapter sleeve and said exhaust pipe for extending beyond the terminal end of said exhaust pipe, means for pivotally securing said exhaust extension to said adapter sleeve to permit access to the terminal end of said pipe upon movement of said extension and spring clip means spaced lonigtudinally from said pivotally securing means for maintaining said exhaust pipe extension in position overlying the exhaust pipe.

3. An exhaust pipe extension for an exhaust pipe of an automotive engine comprising an adapter sleeve for attachment to said exhaust pipe adjacent a terminal end thereof, depending apertured flanges formed integrally with said sleeve and extending beyond the confines of said exhaust pipe, an exhaust extension adapted to overlie said sleeve and having a depending skirt portion with apertures registering with the apertures formed in the depending flanges of said sleeve, means passing through said registering apertures for pivotally securing said extensions to said sleeve, and means depending from said extension and projecting inwardly therefrom to underlie an adjacent portion of said sleeve for retaining said extension in position directly overlying the terminal end of said exhaust pipe.

4. An exhaust extension for the exhaust pipe of an automotive engine comprising an adapter sleeve adapted for attachment to said exhaust pipe, an exhaust extension pivotally secured to said sleeve to overlie said exhaust pipe, depending legs formed integrally with said sleeve and having free terminal edges, and means carried by said extension to underlie the terminal edges of said sleeve legs to retain said extension against pivoting movement away from said pipe.

5. An exhaust pipe extension comprising an adapter sleeve adapted for attachment to an exhaust pipe, an exhaust pipe extension pivotally secured to said sleeve for overlying said sleeve and said pipe, depending legs formed integrally with said sleeve and having free terminal edges, and inturned depending flanges formed integrally with said extension and underlying the terminal edges of said sleeve legs to retain said extension against pivoting movement away from said pipe.

6. An exhaust pipe extension comprising an adapter sleeve adapted for attachment to said exhaust pipe, an exhaust pipe extension pivotally secured to said sleeve for overlying said sleeve and said pipe, depending legs formed integrally with said sleeve and having free terminal edges, and a skirt portion formed integrally with said extension and having an embossment formed thereon to underlie the terminal edges of said sleeve legs.

7. An exhaust pipe extension comprising an adaptor sleeve adapted for attachment to said exhaust pipe, an exhaust pipe extension pivotally secured to said sleeve for overlying said sleeve and said pipe, depending legs formed integrally with said sleeve and having free terminal edges extending therebeyond, said legs having apertures formed therein adjacent said free terminal edges, a skirt portion formed integrally with said extension and extending in closely spaced relation to said legs, and means carried by said skirt and extending into said leg apertures to retain said extension against pivoting movement away from said adaptor sleeve.

JOHN W. HOBBS.
CHARLES A. WOODCOCK.
SHERMAN E. WOMACK.

References Cited in the file of this patent

UNITED STATES PATENTS

| Number | Name | Date |
|---|---|---|
| 470,410 | Pangle | Mar. 8, 1892 |
| 574,072 | Ordner | Dec. 29, 1896 |
| 1,022,643 | Schellenger et al. | Apr. 9, 1912 |
| 2,068,932 | Quarnstrom | Jan. 26, 1937 |

FOREIGN PATENTS

| Number | Country | Date |
|---|---|---|
| 15,099 | Great Britain | July 25, 1901 |